United States Patent
Hisamitsu et al.

(10) Patent No.: US 6,850,937 B1
(45) Date of Patent: Feb. 1, 2005

(54) WORD IMPORTANCE CALCULATION METHOD, DOCUMENT RETRIEVING INTERFACE, WORD DICTIONARY MAKING METHOD

(75) Inventors: Toru Hisamitsu, Oi (JP); Yoshiki Niwa, Hatoyama (JP)

(73) Assignee: Hitachi, Ltd., Tokyo (JP)

( * ) Notice: Subject to any disclaimer, the term of this patent is extended or adjusted under 35 U.S.C. 154(b) by 805 days.

(21) Appl. No.: 09/642,771

(22) Filed: Aug. 22, 2000

(30) Foreign Application Priority Data

Aug. 25, 1999 (JP) .......................................... 11-237845

(51) Int. Cl.⁷ .............................................. G06F 17/30
(52) U.S. Cl. ................... 707/7; 707/6; 707/101; 707/102; 707/104; 707/5; 707/3
(58) Field of Search ................. 707/6, 7, 101, 707/102, 104, 3, 5, 2; 704/2

(56) References Cited

U.S. PATENT DOCUMENTS

| | | | | |
|---|---|---|---|---|
| 5,323,310 A | * | 6/1994 | Robinson | 704/2 |
| 5,732,260 A | * | 3/1998 | Nomiyama | 707/5 |
| 5,826,261 A | * | 10/1998 | Spencer | 707/5 |
| 5,893,092 A | * | 4/1999 | Driscoll | 707/5 |
| 5,909,680 A | * | 6/1999 | Hull | 707/6 |
| 6,003,027 A | * | 12/1999 | Prager | 707/5 |
| 6,018,735 A | * | 1/2000 | Hunter | 707/5 |
| 6,094,653 A | * | 7/2000 | Li et al. | 707/6 |
| 6,154,737 A | * | 11/2000 | Inaba et al. | 707/3 |
| 6,167,398 A | * | 12/2000 | Wyard et al. | 707/5 |
| 6,212,517 B1 | * | 4/2001 | Sato et al. | 707/5 |
| 6,243,713 B1 | * | 6/2001 | Nelson et al. | 707/104.1 |
| 6,496,818 B1 | * | 12/2002 | Ponte | 707/2 |
| 6,507,839 B1 | * | 1/2003 | Ponte | 707/3 |
| 6,523,026 B1 | * | 2/2003 | Gillis | 707/3 |
| 6,594,658 B2 | * | 7/2003 | Woods | 707/5 |

FOREIGN PATENT DOCUMENTS

JP 10074210 3/1998

OTHER PUBLICATIONS

Method of automatic term recognition: A review By Kyo Kageura and Bin Umino Terminology vol. 3 1996. 259–289.

* cited by examiner

Primary Examiner—Thuy N. Pardo
(74) Attorney, Agent, or Firm—Antonelli, Terry, Stout & Kraus, LLP

(57) ABSTRACT

A known method for selecting words (or word sequences), which is an important aspect of information retrieval, involves the problems of inability to eliminate high-frequency common words and of often arbitrary setting of the threshold value for dividing important and unimportant words. These problems are solved by normalizing the difference between the word distribution in a subset of all documents containing a word to be extracted (or a subset of said document set) and the word distribution in the set of all documents with the number of words in the said subset of all documents containing the word as a parameter, and the accuracy of support information retrieval is thereby enhanced.

8 Claims, 8 Drawing Sheets

WORD IMPORTANCE CALCULATION METHOD, DOCUMENT RETRIEVING INTERFACE, WORD DICTIONARY MAKING METHOD

BACKGROUND OF THE INVENTION

The present invention relates to a technique for measuring the importance of words or word sequences in a group of documents, and is intended for use in supporting document retrieval and automatic construction of a word dictionary among other purposes.

FIG. 1 illustrates a document retrieval system having windows for displaying "topic words" in the retrieved documents, wherein the window on the right side selectively displays words in the documents displayed on the left side. An example of such a system is disclosed, for example, in the Japanese Published Unexamined Patent Application No. Hei 10-74210, "Document Retrieval Supporting Method and Document Retrieving Service Using It" (Reference 1).

Kyo Kageura (et al.), "Methods of automatic term recognition: A review," Terminology, 1996) (Reference 2) describes a method of calculating the importance of words. Methods to calculate the importance of words have long been studied with a view to automatic term extraction or facilitating literature searching by weighting words characterizing a desired document.

Words may be weighted either to extract important words from a specific document or to extract important words from all documents. The best known technique in connection with the former is tf-idf, where idf is the logarithm of the quotient of the division of the total number N of documents by the number $N(w)$ of documents in which a certain word w occurs, while tf is the frequency of occurrence $f(w, D)$ of the word in a document d; tf-idf, as the product of these factors, is represented by:

$$f(w,d) \times \log 2(N/N(w))$$

There are variations including the following square root of $f(w, d)$: $f(w, d)^{**}0.5 \times \log 2 (N/N(w))$. Whereas, there also are many other variations, tf-idf is set, as its basic nature, to become "greater as the word occurs more frequently and concentrates in a smaller number of documents."

Though not stated in Reference 2, a natural method to expand this measure, instead of considering the importance of a word in a specific document, into a measure of the importance of the word in the set of all documents is to replace $f(w, d)$ with $f(w)$, which is the frequency of w in all documents.

One of the methods to extract important words from all documents is to measure the accidentalness of differences in the frequency of occurrence of each word from one given document category to another, and to qualify as important words what have a higher degree of non-accidentalness. The accidentalness of differences can be measured by several measures including the chi-square test, and this method requires the categorization of the document set in advance.

In a separate context from these studies, there have been a series of attempts to identify a collection of words (or word sequences) which qualify as important words (or word sequences) from the standpoint of natural language processing. In these studies, methods have been proposed by which words (or word sequences) to be judged as important are to be restricted by the use of grammatical knowledge together with the intensity of the co-occurrence of adjoining words assessed by various measures. As such measures, there are used (pointwise) mutual information, the log-likelihood ratio and so forth.

BRIEF SUMMARY OF THE INVENTION

Techniques so far used involve the following problems: (1) tf-idf (or its like) is not accurate enough—the contribution of the frequency of a word empirically tends to be too large, making it difficult to exclude such too common stop-words as "do"; (2) while a method to compare differences in the distribution of a specific word among categories requires the classification of documents in advance, this requirement generally is not satisfied; (3) a method to utilize the intensity of co-occurrence between adjoining words cannot evaluate the importance of a single word. It is also not easy to extend the methods so that they can treat a word sequence containing n words (n>2); and (4) the setting of a threshold value for selecting important words has been difficult and apt to be ad hoc. An object of the present invention is to provide a method free from such problems.

In the following description, a "term" means a word or a word sequence. To paraphrase the "importance of a term" from the viewpoint of term extraction or information retrieval, that a given term is important means that the term indicates or represents a topic (or topics) of some significance, in other words, the term is informative or domain-specific. In the following, such a term is said to be "representative" and in this context the "importance" of a term is also called the representativeness of a term. Since such a term is likely to be useful in taking an overview of the contents of a document set, it is important in information retrieval or a support system thereto.

In measuring the degree of representativeness, a conventional method would take only the distribution of the pertinent term itself. However, a method like tf-idf is not accurate enough, though it is simple, or a method using a statistic such as the chi square involves difficulty in obtaining statistically significant values for most terms because the frequency of a term is too low to properly apply such a statistical test, except in rare cases, and this results in a low precision.

The present invention takes note not of the distribution of a specific term but, of the distribution of words occurring in association with the term noted. This is based on a working hypothesis that "the representativeness of a term is related to the unevenness of the distribution of words occurring together with the term" and that a given term is "representative" means that "the distribution of words occurring with the term are characteristic."

Therefore, the present invention uses, in calculating the representativeness of a word W, the difference between the word distribution in D (W), the set of documents which consists of every document containing W, and the word distribution in all of the documents from which D(W) derives. In particular, the characteristic consists in that the difference is determined by comparing two distances, d and d'. Here, d is the distance between D (W) and all of the documents, and d', the distance between a randomly selected subset of documents containing substantially the same number of words as D(W) and all of the whole documents, where the concept of "distance between two documents" includes the distance between two word distributions: that in one document set and that in another.

Other and further objects, features and advantages of the invention will appear more fully from the following description.

BRIEF DESCRIPTION OF THE SEVERAL VIEWS OF THE DRAWINGS

A preferred form of the present invention is illustrated in the accompanying drawings in which.

DETAILED DESCRIPTION OF THE INVENTION

Figure 1:
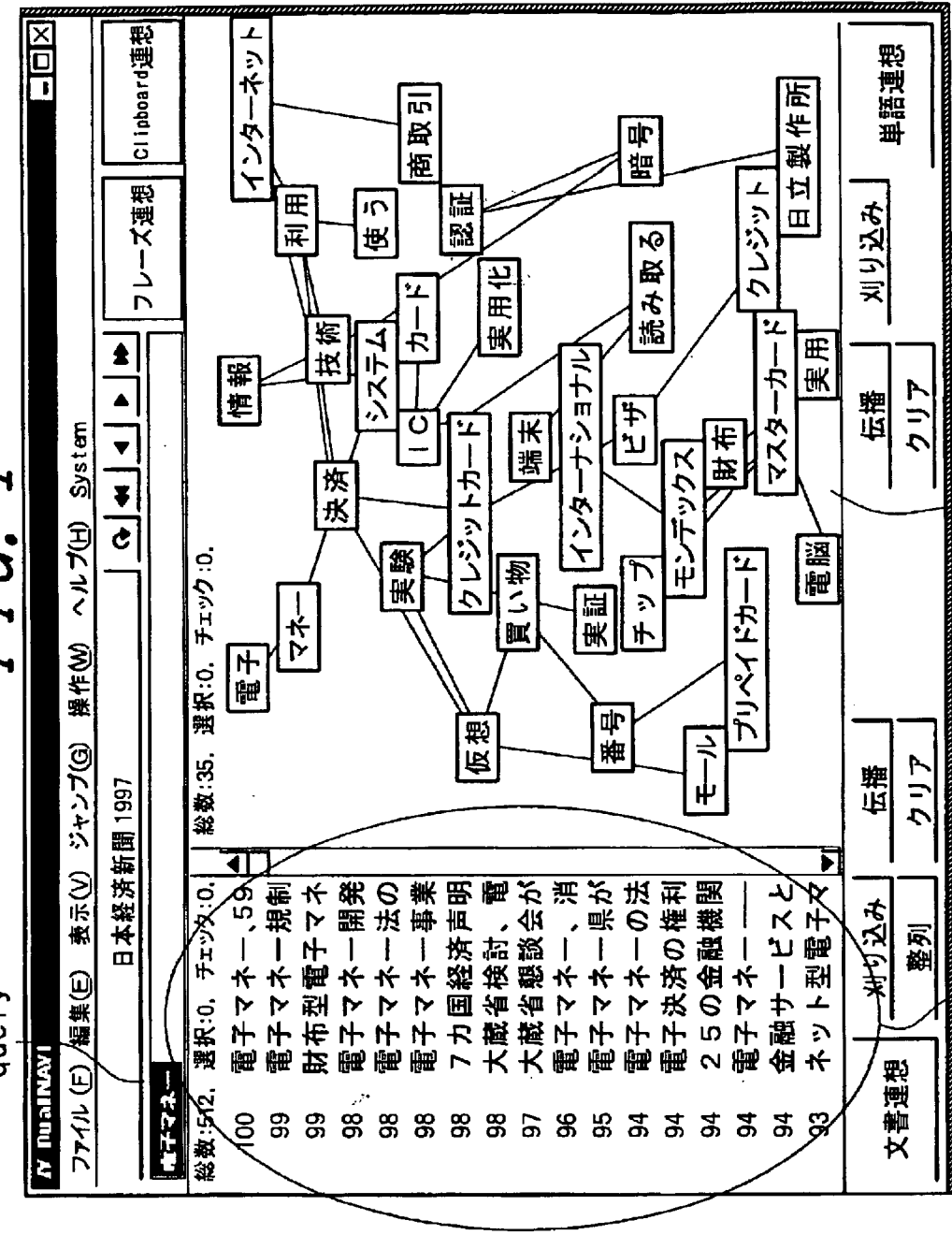
FIG. 1 is a diagram which shows an example of an information retrieval support system having a window to display topic words.

The present invention will be described in detail with reference to an exemplary embodiment.

First will be explained the elements used for implementing the invention. In the drawings, 301 denotes a storage; 3011, text data; 3012, a morphological analysis program; 3013, a word-document association program; 3014, a word-document association database (DB); 3015, a representativeness calculation program; 3016, a representativeness DB; 3017, a shared data area; 3018, a working area; 302, an input device; 303, a communication device; 304, a main memory; 305, a CPU; 306, a terminal device; 4011, a module for calculating background word distribution; 4012, a module for calculating baseline function; 4013, a document extraction module; 4014, a module for calculating co-occurring word distribution; 4015, a module for calculating distance between word-distributions; 4016, a module for normalizing distance between word distributions; 4017, a random sampling module; 544, a topic words displaying routine; 5441, a topic words extraction routine; 5442, a co-occurrence analysis routine; 5443, a graph mapping routine; 5444, a graph displaying routine; 601, storage devices; 6011, text data; 6012, a morphological analysis program; 6013, a word-document association program; 6014, a word-.document association database; 6015, a database for extracted words; 6016, a working area; 6017, a representativeness calculation program; 6018, a representativeness DB; 6019, a shared data area; 601A, a program for extracting word sequences; 601B, a program for grammatical filtering; 601C, a filtering program; 602, an input device; 603, a communication device; 604, a main memory; 605, a CPU; and 606, a terminal device consisting of a display, a keyboard and so forth.

The following description will concern a method for assessing the representativeness of any term and its application to an information retrieval system. First, measures for assessing the representativeness of a term will be introduced by mathematically rephrasing the idea stated in BRIEF SUMMARY OF THE INVENTION above. Thus, with respect to any term W (word or word sequence), note is taken of the word distribution in D(W), the set of documents that consists of every document containing the term W and the word distribution in all of the documents. More specifically, Rep (W), which is the representativeness of W, is defined on the basis of Dist {PD(W), PO}, which is the distance of two distributions PD (W) and PO, where DO is,= the set of the whole documents; PD (W), word distribution in D(W); PO, word distribution in DO.

Whereas many methods of measuring the distance between word distributions are conceivable, the principal ones of which include (1) the log-likelihood ratio, (2) Kullback-Leibler divergence, (3) transition probability and (4)vector-space model (cosign method), it has been confirmed that steady results can be obtained by using, for instance, the log-likelihood ratio. The distance between PD(W) and PO, using the log-likelihood ratio, is defined below where {w1, . . . , wn} represent all words, and ki and Ki, the frequencies of the occurrence of a word wi in D(W) and DO, respectively. Numeridal expression 1:

$$\sum_{i=i}^{n} k_i \log \frac{k_i}{\#D(W)} - \sum_{i=i}^{n} k_i \log \frac{K_i}{\#D_0}$$

Figure 2:
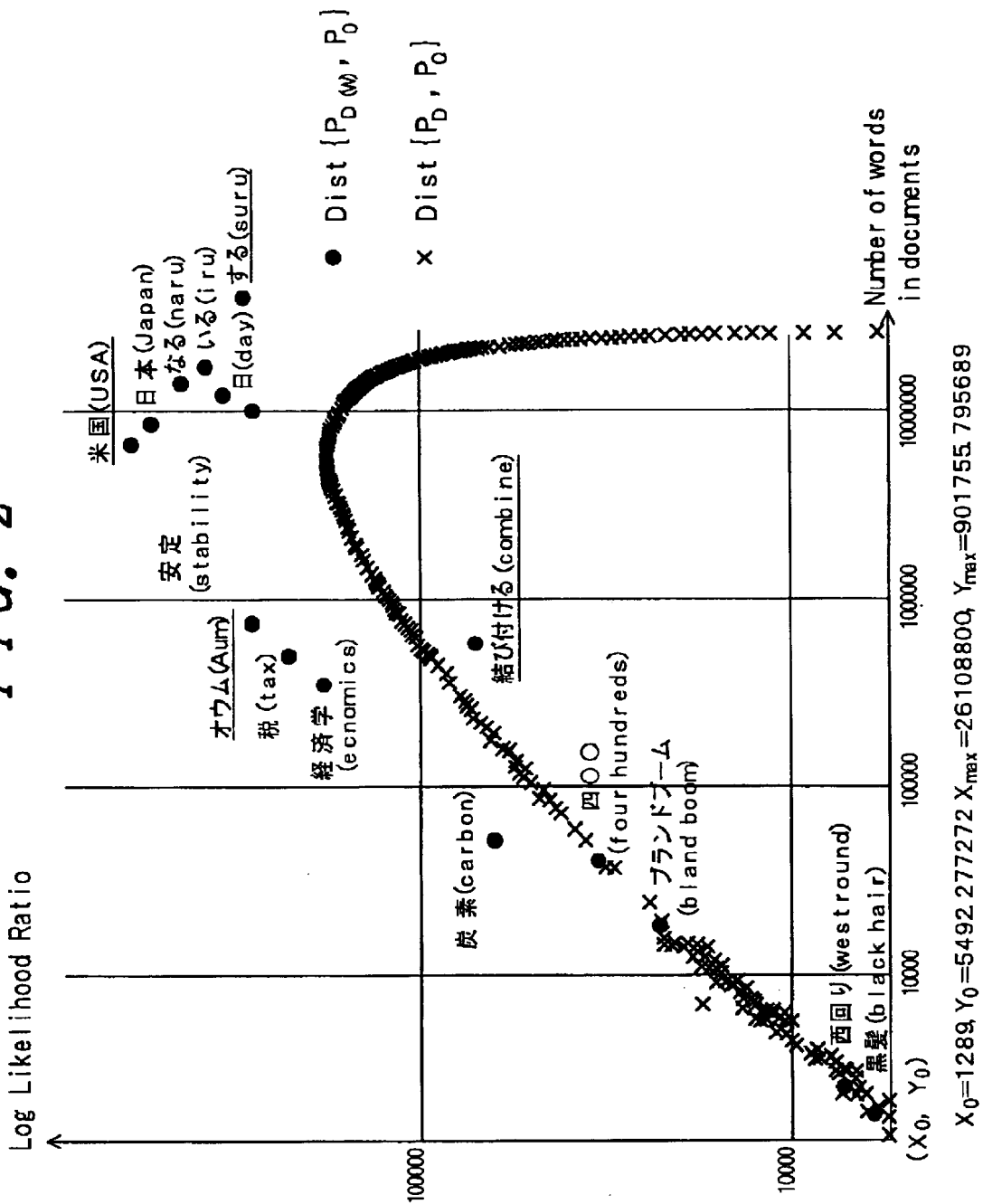
FIG. 2 is a graphical diagram which shows an example of distance between two word distributions.

FIG. 2 displays words corresponding to coordinates (#D(W), Dist{PD(W), PO})s where W varies over said words, and also it plots coordinates (#D, Dist{$P_D$, $P_o$})s where D varies over randomly selected document sets, where the displayed words and the document sets are taken from articles in the 1996 issues of a financial newspaper *Nihon Keizai Shimbun*.

As seen in FIG. 2, comparison of Dist{PD(W1), PO} and Dist{PD(W2), PO} is consistent with what human intuition indicates when #D(W1) and #D(W2) are close to each other. For instance, "USA" has a higher value of Dist {PD(W), PO} than "suru" (do) and so does "Aum", which is the name of an infamous cult, than "combine". However, a pair of terms whose #D(W) values widely differ, (this means that there is a large difference between the frequency of two terms) cannot be appropriately compared in terms of representativeness, because usually Dist{PD(W), P0} increases as #D(W) increases. Actually, "Aum" and "suru" are about equal in Dist{PD(W), P0}, which is contrary human linguistic intuition. Then, in order to offset the intrinsic behavior of Dist {, P0}, {(#D, Dist{PD, P0})}s plotted in FIG. 2 using "x" marks are to be investigated. These points are likely to be well approximated by a single smooth curve beginning at (0, 0) and ending at (#D0, 0). This curve will be hereinafter referred to as the baseline curve.

Whereas it is evident that by definition Dist{PD, P0} is 0 when D=φ and D=DO, it has been confirmed that the behavior of the baseline curve in the neighborhood of (0,0) is stable and similar to each other when the size of all of the documents varies over a broad range (say, about 2,000 document to a full-year total of newspapers amounting to about 3000,000 documents).

Then, an approximating function B( ) is figured out in a section (1000≦#D<20000) where the baseline curve can be approximated with steadily high accuracy using an exponential function, and the level of representativeness of W satisfying the condition of $1000 \leq \#D(W) < 20000$ is defined by a value: Rep $(W)=Dist\{PD(W), PO\}/B(\#D(W))$, that is, a value obtained by normalizing $Dist\{PD(W), PO\}$ with $B(\ )$. (It has to be noted that the "words" in this context are already cleared of all those which are considered certain to be unnecessary as query terms for information retrieval, such as symbols, particles and auxiliary verbs. While the same method can be realized even if these elements are included, in that case there will be some changes in the above-cited numerals.)

With a view to making it possible to use the well-approximated region of the aforementioned baseline function even where $\#D(W)$ is significantly great as in the case of "suru" and to reducing the amount of calculation, about 150 documents are extracted at random from $D(W)$, which is denoted $D'(W)$, so that $20,000<\#D'(W)$ holds, and Rep $(W)$ is calculated using $D'(W)$ instead of $D(W)$.

On the other hand, as the approximating function of the baseline curve figured out in the aforesaid section tends to overestimate the value in $(x\ 10 \leq x < 1000)$, Rep $(W)$ is likely to be underestimated for W in the range of $\#D(W) \leq 1000$ as a result of normalization. However, whereas 1000 words approximately correspond to two or three newspaper articles, terms which occur in the number of documents in that order is not very important for our purpose, the calculated result was applied as it was. Of course, another baseline may as well be calculated in advance. $Dist\{PD\}, PO\}/B(\#D)$ in the randomly sampled document set D steadily gave an average, Avr, of approximately 1 ($\pm 0.01$) and a standard deviation $\sigma$ of around 0.05 in various corpora. Since the maximum never surpassed Avr+4 $\sigma$, as the basis of judgment that the Rep(W) value of a given term is "a meaningful value" or not, a threshold value of Avr+4 $\sigma$=1.20 is provided.

The above-cited measure Rep( ) has such desirable features that (1) its definition is mathematically clear, (2) it allows comparison of highly frequent terms and infrequent terms, (3) the threshold value can be defined systematically, and (4) it is applicable to terms consisting of any number of words.

The effectiveness of the measure Rep( ) proposed in the present invention has been confirmed by experiments as well. Out of words which have occurred three times or more in total in the articles in the 1966 issues of the *Nihon Keizai Shimbun*, 20,000 words were extracted at random, and 2,000 of them were manually classified into three categories: their occurrence in the overview of retrieved contents is "desirable - - - a", "neither desirable nor undesirable" and undesirable - - - d". The 20,000 words are ranked by a measure and the number of words which are classified into a specified class and appear between the first word and the Nth word, which number is hereafter called the "accumulated number of words", is compared to that obtained by using another measure. In the following, four measures will be used, comprising random (i.e., no measure), frequency, tf-idf and a proposed measure. Here the tf-idf the version of tf-idf covering all documents, which was explained in the discussion of THE BACKGROUND OF THE INVENTION. Thus, it is defined as $f(w)** 0.5 \times \log 2 (N/N(w))$ where N is the number of all the documents, N (w) is the number of documents in which w appears, and f (w) is the frequency of w in all the documents.

Figure 7:
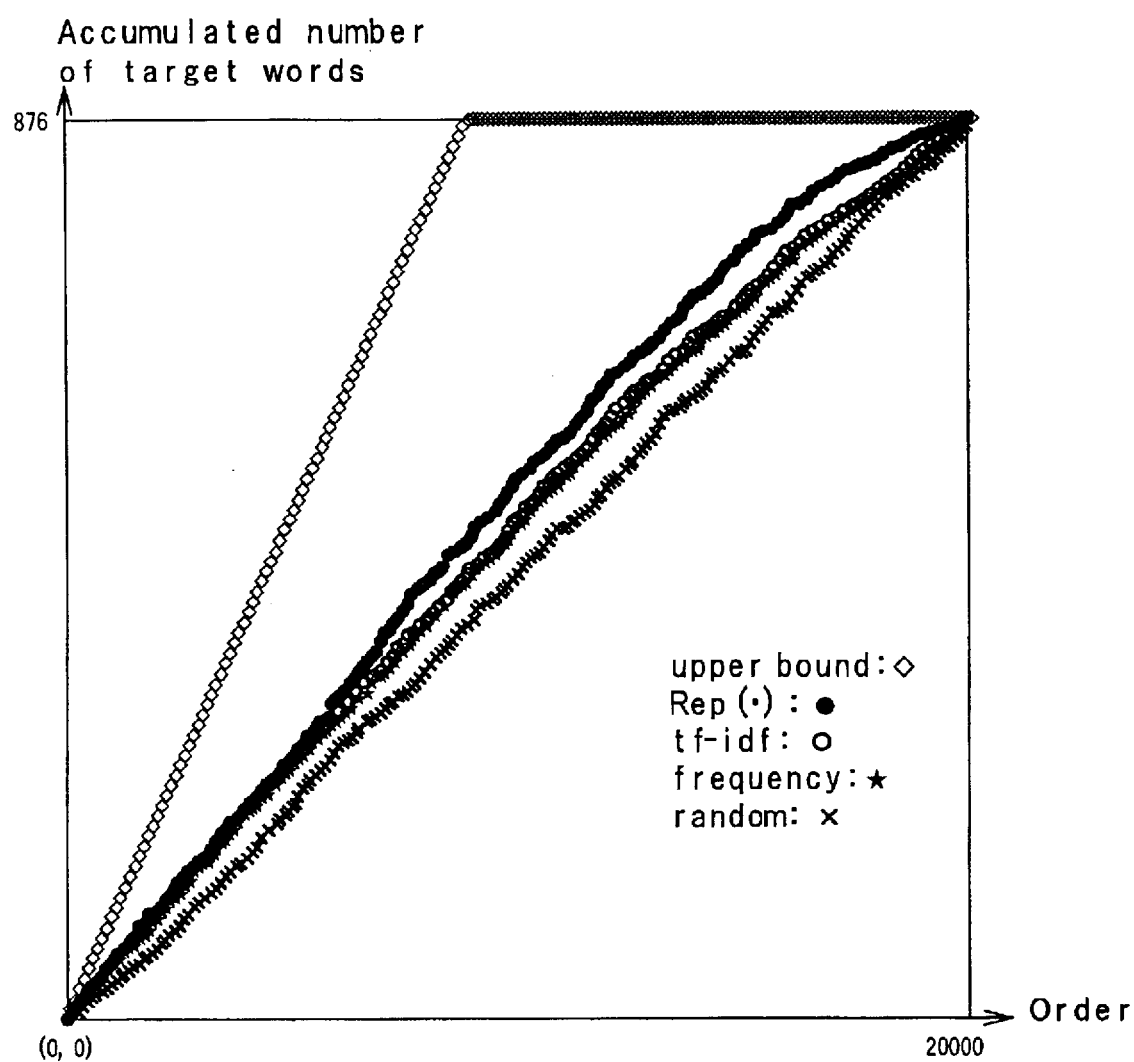
FIG. 7 is a graph of results of an experiment showing how the proposed word importance raises the ranks of words considered suitable for summarizing the results of retrieval in comparison with other measures.

FIG. 7 shows a comparison of the accumulated number of words classified as "a". As is evident from the graph, the force to raise the ranks of words classified as "a" is stronger in the order of random<frequency<tf-idf<proposed measure.

Figure 8:
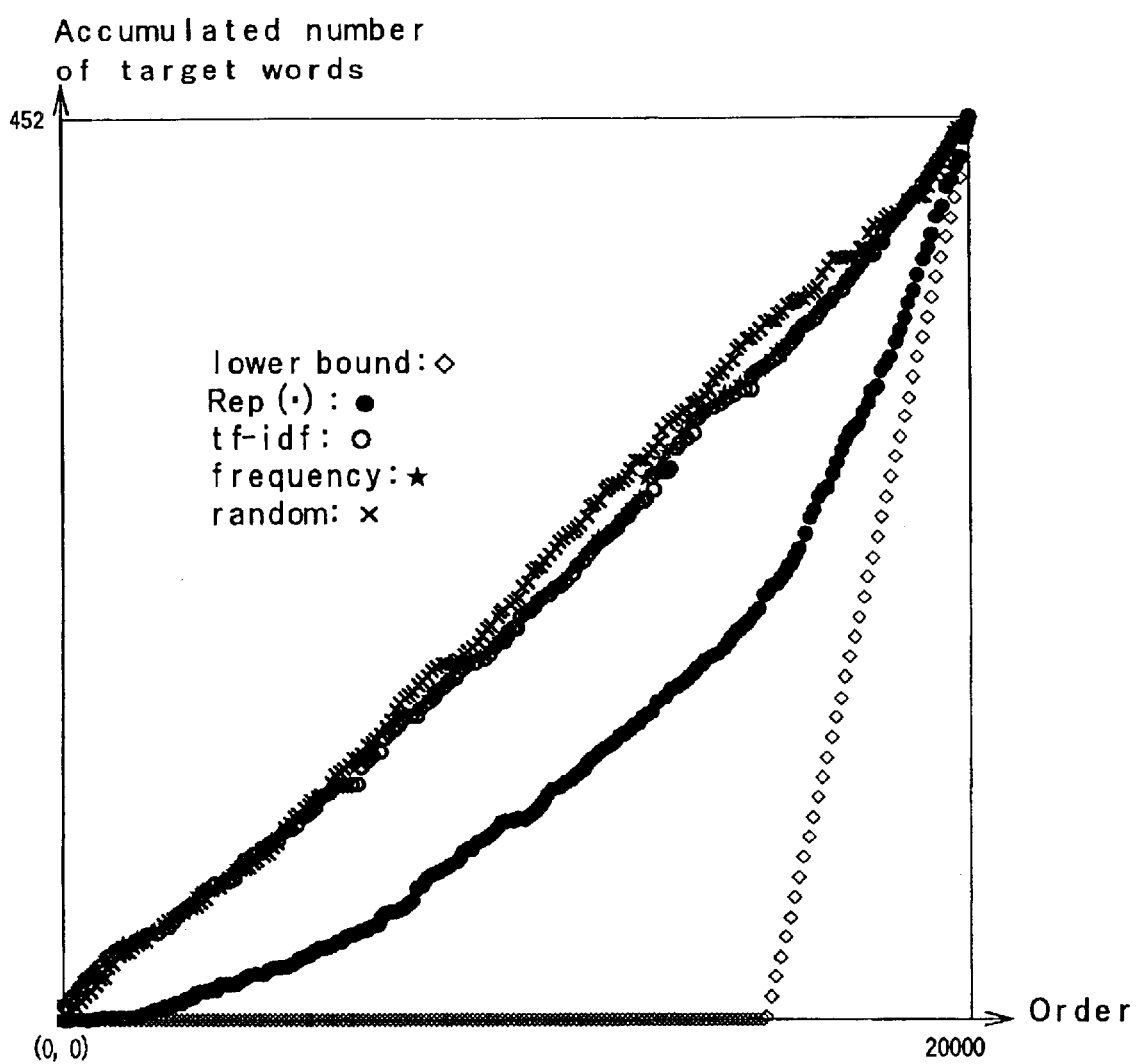
FIG. 8 is a graph of results of an experiment showing how the proposed word importance lowers the ranks of words considered unsuitable or unnecessary for summarizing the results of retrieval in comparison with other measures.

The improvement is evidently significant. FIG. 8 shows a comparison of the accumulated numbers of words classified as "d"; in this case, the superiority of the proposed measure in sorting capability is distinct. Frequency and tf-idf are no different from random cases, revealing their inferiority in the "stop-word" identifying capability. In view of these findings, the measure proposed according to the invention is particularly effective in identifying stop-words, and is expected to be successfully applied to the automatic preparation of a stop-word lists and the improvement of the accuracy of weighting in the calculation of document similarity by "excluding frequent but non-representative words".

Figure 3:
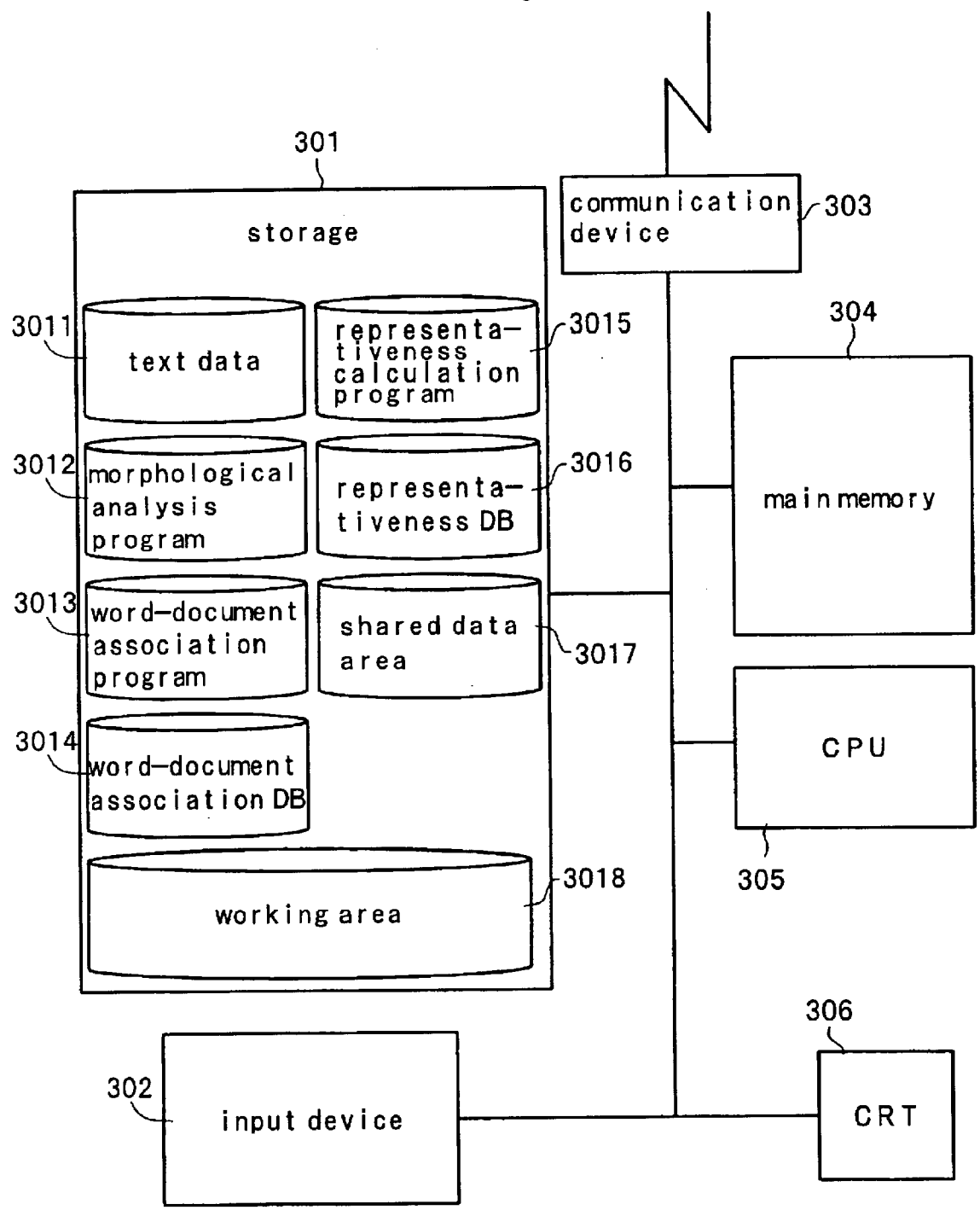
FIG. 3 is a block diagram of a retrieval system for realizing a proposed word importance calculation method.

An example of the system configuration for the calculation of representativeness so far described is illustrated in FIG. 3. Calculation of representativeness will now be described below with reference to FIGS. 3 and 4, in which 301 denotes a storage for storing document data, various programs and so forth using a hard disk or the like. It is also utilized as a working area for programs. As components of the storage, 3011 denotes document data (although Japanese is used in the following example, this method is not language-specific); 3012 denotes a morphological analysis program for identifying words constituting a document (it performs such processing as word separation by spaces and part-of-speech tagging in Japanese, or stemming in English; this method is not specified; various systems are disclosed in both languages, whether for commercial use or research purposes); 3013 denotes a word-document association program (for checking,-according to the results of morphological analysis, which word occurs in which document and how often, or conversely in which document how many times which word occurs; basically this is a task to fill elements of a matrix having words as rows and documents as columns by counting, and no particular method is specified for this task); 3014 denotes a word-document association database (DB) for recording word-document association data calculated, as described above; 3015 denotes a representativeness calculation program, a program for calculating the representativeness of a term, whose details are shown in FIG. 4; 3016 denotes a DB for recording the calculated representativeness of terms; 3017 denotes an area for a plurality of programs to reference data in a shared manner; 3018 denotes a working area; 302 denotes an input device; 303 denotes a communication device; 304 denotes a main memory; 305 denotes a CPU; and 306 denotes a terminal device consisting of a display, a keyboard and so forth.

Figure 4:
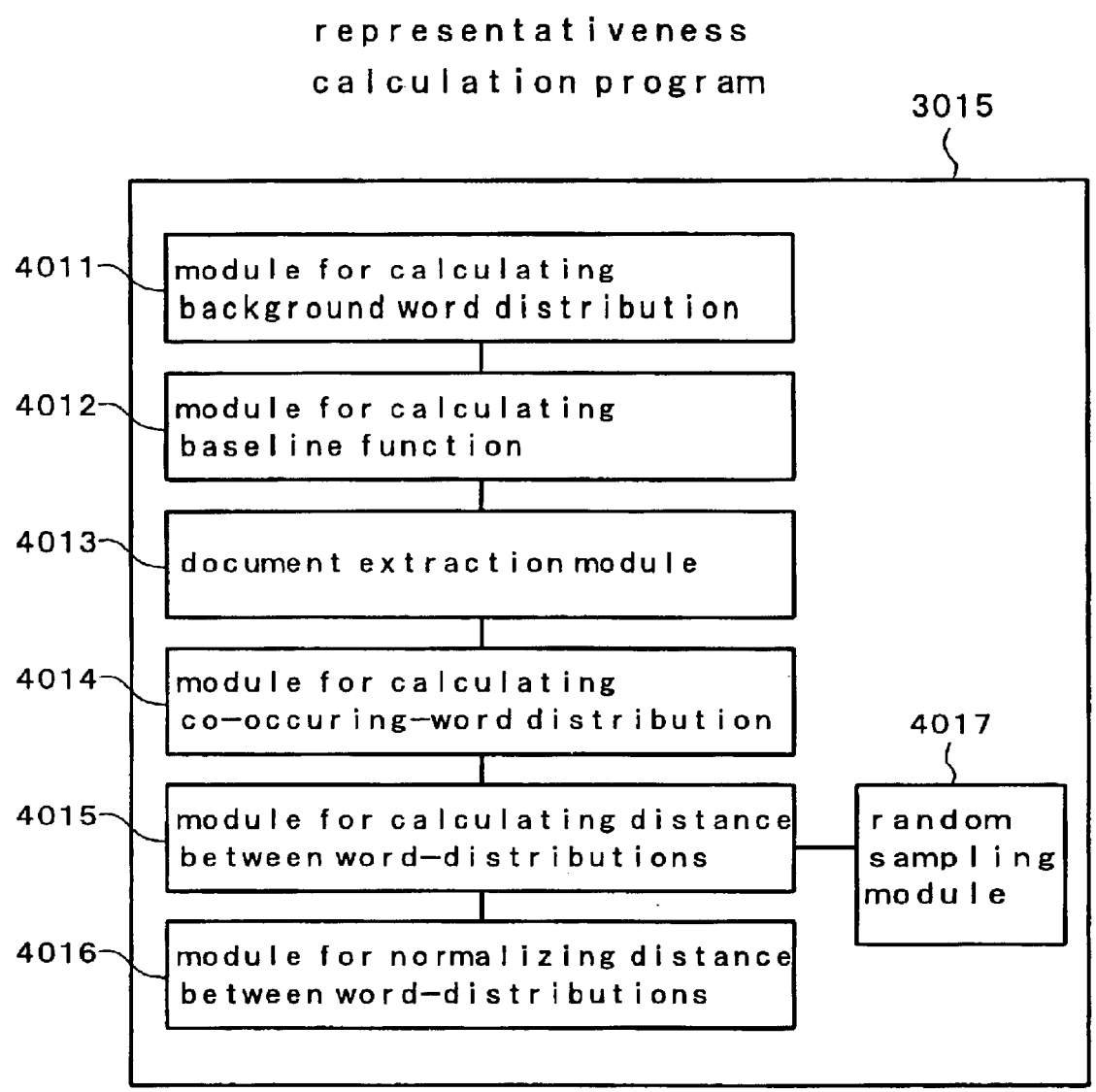
FIG. 4 is a flow chart which shows the configuration of a representativeness calculation program.

FIG. 4 illustrates details of the representativeness calculation program 3015. The method of calculating the representativeness of a specific term by using this program will be described below. In the figure, 4011 denotes a module for calculating background word distribution. This module is used only once and records the frequency of each word in the whole documents. Thus, all words being represented by (wl, . . . , wn) and Ki denoting the frequency of the occurrence of a word wi in the whole document D0 as is the case with Numerical expression 1, (Kl, . . . Kn) is recorded. Reference numeral 4012 denotes a module for estimating the baseline function with regard to given document data. This module, too, is used only once at the beginning. It can be realized by combining the following basic elements: (1) When the whole document sets are given, document sets the number of words in which range from around 1000 to around 20,000 are selected at random repeatedly, and at each repetition, the distance between the word distribution in each selected domument set and the word distribution in the whole documents obtained by 4011, is calculated using Numerical expression 1. (2) Baseline function B ( ) is figured out using $\{(\#D, \text{Dist} \{PD, P0\})\}$s and the least square method or the like, where D varies over randomly selected document sets in (1) and (#D, Dist{PD, PO}) was calculated for each D in (1). B( ) is a function from the number of words to a positive real number. No particular method is specified for this approximation. Standard methods are available.

Reference numeral 4013 denotes a document extraction module. When term W=wn1 ... wnk is given, a document set $D(wni)(1 \leq i \leq k)$ is obtained from the word-document association DB 3014 and the intersection of all D (wni) $(1 \leq i \leq k)$ is taken to determine D(W). If the word-document association DB 3014 records the information on the position of a word in every document, the set of all documents containing term W=wn1 ... wnk can be obtained, which is a subset of the intersection of all D(wni) $(1 \leq i \leq k)$. If the word-document association DB 3014 does not record the information on the position of a word in the document, the intersection of all D(wni) $(1 \leq i \leq k)$ is taken as D(W) as an approximation. Numeral 4014 denotes a module for calculating co-occurring word distribution. Again the frequency of each word in D(W) is counted from the word-document association DB 3014 to determine the frequency ki of wi in D(W) $(1 \leq i \leq k)$ Numeral 4015 denotes a module for calculating the distance between word distributions. Using Numerical expression 1 and the word frequencies obtained by 4011 and 4014, the distance Dist{PD(W), PO} between theword distribution in the whole documents and the word distribution in D(W) is calculated. Numeral 4016 denotes a module for normalizing the aforementioned distance Dist{ PD(W), PO }. Using the number of words in #D(W), which is denoted #D(W), and B( ) obtained by 4012, it calculates the representativeness of W as Rep(W)=Dist{PD(W), P0}/B(#D(W)). Numeral 4017 denotes a random sampling module, which is used in 4013 to select a predetermined number of documents when the number of documents contained in D(W) surpasses a predetermined number (recorded in the shared data area 3017). While in this instance the number of documents is used as the predetermined number, it is also possible to use the desirable number of words as the predetermined number and to make the number of words in randomly sample documents as close to the predetermined number as possible.

Figure 5:
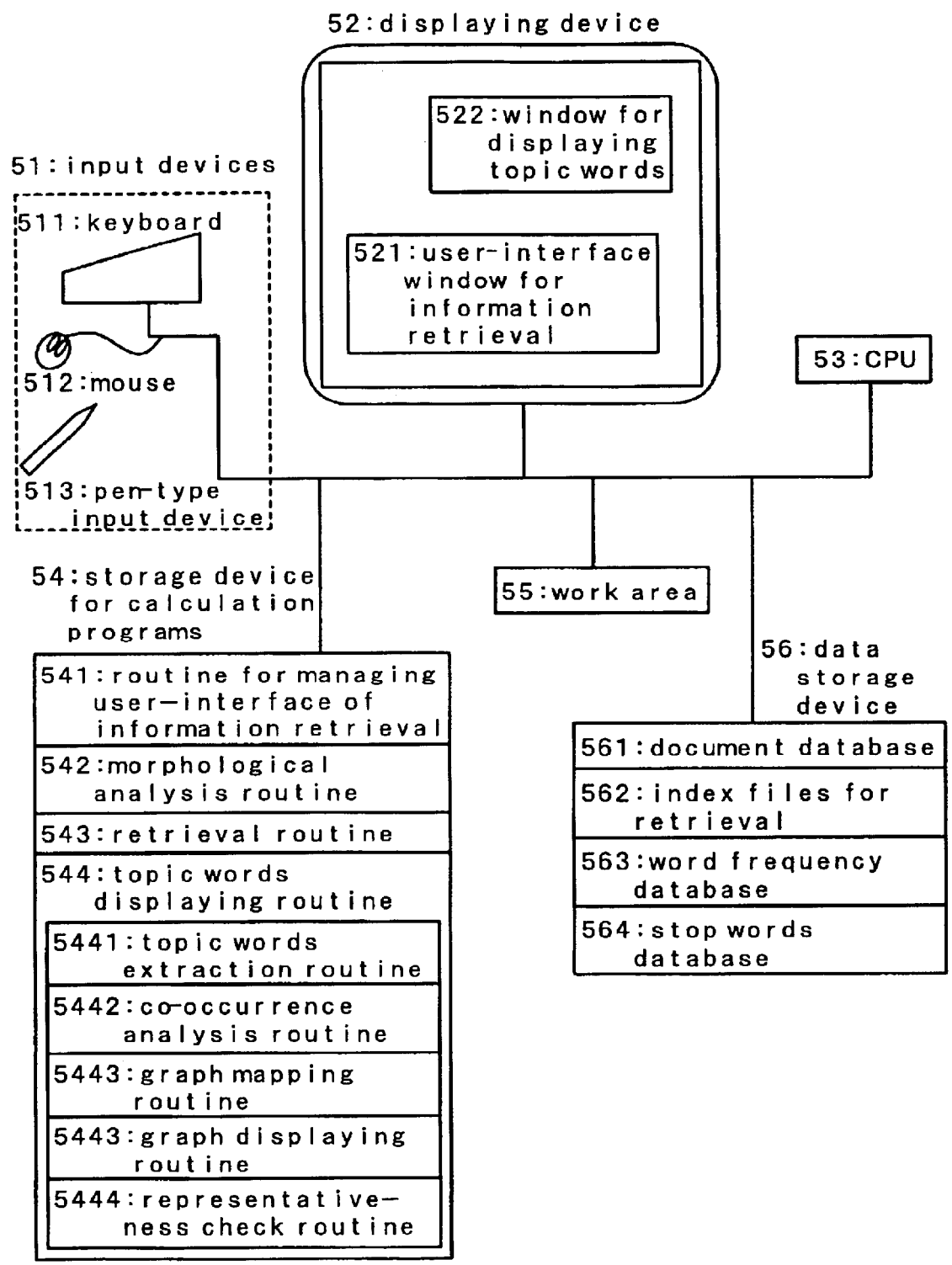
FIG. 5 is a block diagram which shows an example of a configuration for use in applying representativeness to the display of retrieved documents in support of document retrieval.

FIG. 5 shows an example of the configuration for the application of the invention for assisting document retrieval. This diagram illustrates the configuration of a retrieving apparatus where the invention is applied to the displaying of topic words in a navigation window in line with the configuration shown in FIG. 1 of the document retrieval support method according to Reference 1. It differs from the document retrieval support method according to Reference 1 in that, in a topic words displaying routine 544, a representativeness check routine 5445 is added, and in a topic words extraction routine 5441, a co-occurrence analysis routine 5442, a graph mapping routine 5443 and a graph displaying routine 5444, the representativeness check routine is used. The representativeness check routine is a routine to return the representativeness of each word in the set of all of the documents. It is possible to calculate in advance the representativeness of each word according to the program shown in FIG. 4.

When the user enters a retrieval keyword from a keyboard 511, the titles of the documents containing that keyword, which are the result of retrieval, are displayed on a user-interface window for information retrieval 521, and topic words selected out of the document set are displayed on a window for displaying topic words 522. First, words are selected in the topic words extraction routine 5441 by the method of Reference 1. Although the words selected here include, as stated earlier, common words such as "suru" and "kono" (this), the displaying of highly frequent stop-words can be suppressed by checking the representativeness of words according to the representativeness check routine 5445 and excluding words whose representativeness values are smaller than a preset threshold (for instance, 1.2). Furthermore, if displayed words overlap each other by the method of Reference 1, it is easy to display the word higher in representativeness more to the front or to display in a heavier tone the word higher in representativeness by using the representativeness check routine 5445 in the graph mapping routine 5443 and the graph displaying routine 5444. Thus, it is possible to display words higher in representativeness in a more conspicuous way and thereby improve the user interface. Furthermore, while the foregoing description suggests calculation of the representativeness of each word in advance according to the program shown in FIG. 4, it is also possible to regard each set of the documents obtained for each input keyword as the, set of whole documents a new, and calculate, according to the program shown in FIG. 4, the representativeness of each word contained in the documents, which is the result of retrieval, as it occurs. If the representativeness check routine 5445 is so designed, the representativeness of the same word may differ with the keyword, and, accordingly, it will be possible to display topic words in a manner reflecting the retrieval situation more appropriately.

Figure 6:
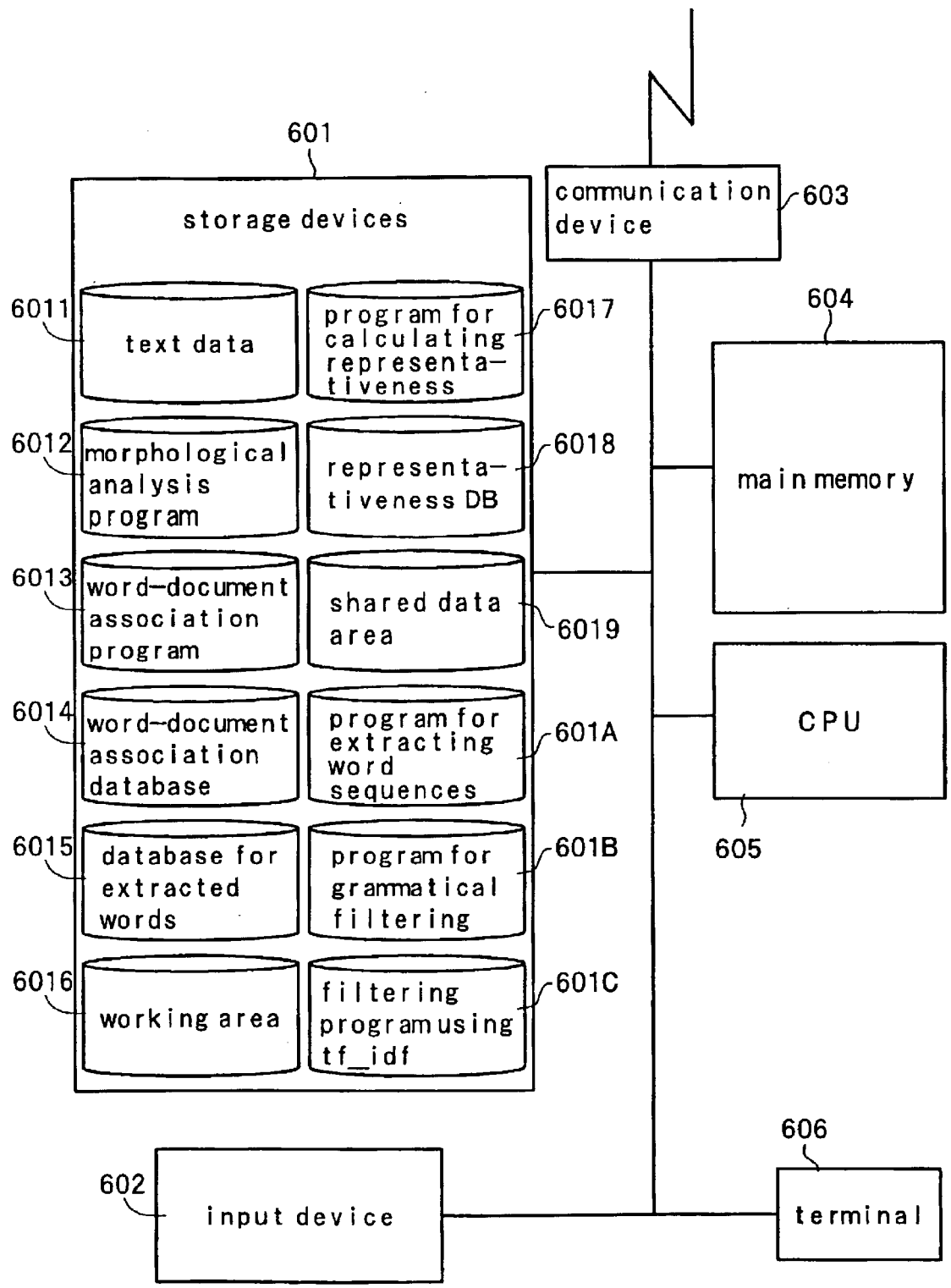
FIG. 6 is a block diagram which shows an example of a configuration for use in applying representativeness to automatic word extraction.

FIG. 6 shows an example of the configuration for use in applying representativeness to automatic word extraction. In the figure, 601 denotes a storage for storing document data, various programs and so forth using a hard disk or the like. It is also utilized as a working area for programs. Thereafter, 6011 denotes document data (although Japanese is used in the following example, this method is not language-specific); 6012 denotes a morphological analysis program for identifying words constituting a document (it performs such processing as word separation by spaces and part-of-speech tagging in Japanese, or stemming in English; this method is not specified; various systems are disclosed in both languages, whether for commercial use or research purposes); 6013 denotes a word-document association program (for checking, according to the results of morphological analysis, which word occurs in which document and how often, or conversely in which document how many times which word occurs; basically this is a task to fill elements of a matrix having words as rows and documents as columns by counting, and no particular method is specified for this task); 6014 denotes a word-document association database (DB) for recording word-document association data calculated as described above; 6015 denotes an extracted word storing DB; 6017 denotes a representativeness calculation program, whose details are shown in FIG. 4; 6018 denotes a program for calculating the representativeness of a term; 6019 denotes an area for a plurality of programs to reference data in a shared manner; 601A denotes a program to select the words or word sequences which will become the candidates for extraction (though the contents are not specified, words such as particles, auxiliary verbs and affixes are usually excluded from a given result of document morphological analysis); 601B denotes a filter for utilizing grammatical knowledge to exclude word sequences unsuitable as terms out of the candidates selected by 601A (for instance, sequences in which a case affix or an auxiliary verb comes first or last are excluded; though the contents are not specified, a number of examples are mentioned in the paper cited as Reference 2). The candidates selected by 601B undergo the calculation of importance by 601C according to a specific measure and, those lower than a preset level of that measure being excluded, are sorted according to importance and are outputted. While this is called the tf_idf filter program after the name of the most frequently used measure, the actually used measure may be any appropriate measure other than tfi_df. Reference numeral 6016 denotes a working area; 602 denotes an input device; 603 denotes a communication device; 604 denotes a main memory; 605 denotes a CPU; and 606 denotes a terminal device consisting of a display, a keyboard and so forth. The usual word extraction method uses neither 6017 nor 6018. In response to the output of 601C, the representativeness of each candidate is referenced by 6017 and 6018, and those whose measures which are lower than a preset level (for instance 1.2) are excluded. A conceivable variation would use 6017 and 6018 in 601C to directly reference the representativeness of each candidate, and select the candidate terms according to representativeness as the sole criterion.

An experiment was carried out using the automatic word extraction method of the configuration illustrated in FIG. 6, and terms were extracted from the abstracts of 1,870 papers on artificial intelligence. About 18,000 term candidate's were extracted by 601A and 601B. Two procedures were tested: in one procedure only representativeness was used and in the other term candidates were first sorted by tf-idf and the output of the sorting was cleared of unimportant words by using representativeness. The two procedures equally produced about 5,000 term candidates, but the latter tended to extract terms in a sequence close to the order of frequency, so that in seeking final selection by human judgment, the latter may be more natural in a way because familiar words come relatively early.

By using representativeness as proposed by the present invention, there is provided a representativeness calculation which, with respect to terms in a document set, (1) gives a clear mathematical meaning, (2) permits comparison of high-frequency terms and low-frequency terms, (3) makes possible setting of a threshold value in a systematic way, and (4) is applicable to terms containing any number of words. Thus, a method to calculate the importance of words or word sequences can be realized, which would prove useful in improving the accuracy of word information retrieval interfaces and word extraction systems.

While the invention has been particularly shown and described with reference to embodiments thereof, it will be understood by those skilled in the art that the foregoing and other changes in form and details can be made therein without departing from the spirit and scope of the invention.

What is claimed is:

1. A word importance calculation method for calculating the importance of words contained in a document set, whereby the difference between the word distribution in a subset of every document containing a specified word and the word distribution in a set of whole documents including said subset is used to calculate the importance of the word.

2. A word importance calculation method, as claimed in claim 1, wherein:

said difference is determined by comparing the distance d between said subset and said set of whole documents with the distance d', or the estimated value of d', between another subset of documents which contain substantially the same number of words as said subset of documents and are randomly selected from said subset of whole documents, and said set of whole documents.

3. A word importance calculation method, as claimed in claim 2, wherein:

the distance d between the two document sets is calculated by using the probability of occurrence of each word in each of said document set.

4. A word importance calculation method, as claimed in claim 2, wherein:

in case that the number of documents containing said word is larger than a prescribed number, a preset number of documents are extracted from the said subset of whole documents by random sampling, and the difference between the extracted set of documents and said set of whole documents is used instead of the difference between the original subset of documents and the set of whole documents.

5. A word importance calculation method according to claim 1, said difference being defined by $$\sum_{i=i}^{n} k_i \log \frac{k_i}{\#D(W)} - \sum_{k=i}^{n} k_i \log \frac{K_i}{\#D_0}$$

D(W) being said subset,

D0 being the set of the whole document, $k_i$ being a frequency of an occurrence of the specified word in D(W), $k_i$ being a frequency of an occurrence of the specified word in D(0).

6. A document retrieval interface having a function to display on a screen words characterizing a document set, wherein the importance of each word occurring in a set of whole documents is calculated using the difference between the word distribution in the subset of every document containing the word and the word distribution in the set of whole documents including said subset, and the importance is brought to bear on the selection, arrangement or coloring of the words displayed on the screen.

7. A document retrieval interface having a function to display on a screen words characterizing a document set, wherein the importance of each word occurring in the document set obtained as a result of retrieval is calculated using the difference between the word distribution in the subset of documents out of the document set obtained as a result of that retrieval containing that word and the word distribution in the document set obtained as a result of that retrieval, and the importance is brought to bear on the selection, arrangement or coloring of the words displayed on the screen.

8. A word dictionary construction method by extracting important words from a document set in accordance with rules given in advance, wherein the importance of each word occurring in a set of whole documents is calculated using the difference between a subset of every document containing the word and the word distribution in the set of whole documents including said subset, and words to be extracted are selected on the basis of that importance.

* * * * *